(12) United States Patent
Han et al.

(10) Patent No.: US 12,051,326 B2
(45) Date of Patent: Jul. 30, 2024

(54) ROAD TRAFFIC EXTRACTION FOR UNKNOWN ANOMALY DETECTION USING DISTRIBUTED FIBER OPTIC SENSING

(71) Applicant: NEC Laboratories America, Inc., Princeton, NJ (US)

(72) Inventors: Shaobo Han, Princeton, NJ (US); Ming-Fang Huang, Princeton, NJ (US); Philip Ji, Cranbury, NJ (US); Yueheng Chen, South Brunswick, NJ (US); Milad Salemi, Cross River, NY (US)

(73) Assignee: NEC Corporation, Tokyo (JP)

( * ) Notice: Subject to any disclaimer, the term of this patent is extended or adjusted under 35 U.S.C. 154(b) by 360 days.

(21) Appl. No.: 17/575,610

(22) Filed: Jan. 13, 2022

(65) Prior Publication Data

US 2022/0230539 A1 Jul. 21, 2022

Related U.S. Application Data

(60) Provisional application No. 63/137,883, filed on Jan. 15, 2021.

(51) Int. Cl.
*G08G 1/04* (2006.01)
*G06V 10/48* (2022.01)
*G08G 1/01* (2006.01)

(52) U.S. Cl.
CPC ............ *G08G 1/04* (2013.01); *G06V 10/48* (2022.01); *G08G 1/0116* (2013.01); *G08G 1/0133* (2013.01); *G08G 1/0145* (2013.01)

(58) Field of Classification Search
CPC .... G08G 1/04; G08G 10/0116; G08G 1/0133; G08G 1/0145; G06V 10/48
See application file for complete search history.

(56) References Cited

U.S. PATENT DOCUMENTS

2014/0029852 A1* 1/2014 Pisipati .................... G06T 7/13
382/199

OTHER PUBLICATIONS

Balzanella, Antonio, et al. "Automatic classification of road traffic with fiber based sensors in smart cities applications." Computational Science and Its Applications—ICCSA 2020: 20th International Conference, Cagliari, Italy, Jul. 1-4, 2020, Proceedings, Part IV 20. (Year: 2020).*

* cited by examiner

*Primary Examiner* — David Perlman
(74) *Attorney, Agent, or Firm* — Joseph Kolodka

(57) ABSTRACT

Aspects of the present disclosure describe DFOS systems, methods, and structures that advantageously extract road traffic from DFOS vibration patterns such that anomaly detection is possible. Sensed vibration data is represented accurately as a set of points, where each point is denoted as a tuple with elements indicating a time stamp, a location along a length of a DFOS optical sensing cable, and vibration strength detected at the location at the time. Traffic pattern detection is based on a progressive probabilistic Hough transform (PPHT) that exploits global information from an entire spatial-temporal data snapshot to assess a cause of detected vibrations.

3 Claims, 13 Drawing Sheets

ROAD TRAFFIC EXTRACTION FOR UNKNOWN ANOMALY DETECTION USING DISTRIBUTED FIBER OPTIC SENSING

CROSS REFERENCE TO RELATED APPLICATIONS

This application claims the benefit of U.S. Provisional Patent Application Ser. No. 63/137,883 filed 15 Jan. 2021 the entire contents of which is incorporated by reference as if set forth at length herein.

TECHNICAL FIELD

This disclosure relates generally to distributed fiber optic sensing (DFOS). More particularly, it pertains to the detection/determination of unknown anomalies from normal road traffic using distributed optical fiber sensing systems and methods.

BACKGROUND

As will be understood by those skilled in the art, distributed optical fiber sensing (DFOS) techniques have been employed for threat detection as they can sense vibration signals in the vicinity of optical fiber cables and generate time-stamped data streams of vibrations—providing valuable information to decision makers in road traffic management and communication facility protection. To achieve both goals of traffic monitoring/management and anomaly detection via DFOS, isolating the causes of vibrations due to normal traffic from anomalous sources is a difficult challenge.

SUMMARY

An advance in the art is made according to aspects of the present disclosure directed to DFOS systems, methods, and structures that advantageously extract road traffic from DFOS vibration patterns such that anomaly detection is possible.

In sharp contrast to the prior art, our inventive method represents sensed data accurately as a set of points, where each point is denoted as a tuple with elements indicating a time stamp, a location along a length of a DFOS optical sensing cable, and vibration strength detected at the location at the time.

Our inventive traffic pattern detection is based on a progressive probabilistic Hough transform (PPHT). Markedly different from prior-art methods based on local kernel matching on images, our detection method exploits global information from an entire spatial-temporal data snapshot to assess a cause of detected vibrations. Importantly, our inventive method does not require a regular grid of images, so it is applicable to practical sensing scenarios where the time stamps are not equidistant. Different from traditional Hough Transform (HT) for line detection, our method segments traffic traces from individual vehicles, even if they are discontinuous and/or ambiguous in a certain region. Additional parameters of PPHT according to aspects of the present disclosure namely a minimum specified length of vehicle trace and maximum gap between adjacent traces make traffic counts more accurate than was possible in the prior art. Finally, the progressive nature of our method minimizes operations needed and as a result is ideally suited for data of a streaming nature such that only limited processing power is required.

Operationally, a saliency of each point along the optical sensing fiber at which a vibration is detected is determined locally using a rule of interquartile range (IQR). Although the saliency of each vibration point along the sensing fiber can be determined locally, the spatial-temporal pattern of relevant points is considered to determine its cause. By applying the PPHT algorithm, the cause of each vibrating point can be attributed globally by evaluating other points of vibration along the sensing fiber. As a result, a group of points of vibration are classified as caused by traffic if they collectively form a linear shape that aligns well with any prior knowledge obtained. Advantageously, the entire procedure requires no training and no labeling of the traffic regions or anomaly regions.

A traffic filter module further refines identified traffic traces, according to any minimum and maximum speed limit allowed. Once a traffic trace is detected on a waterfall plot, any nearby points of vibration can be attributed as well—if the nearby point is within a pre-determined distance.

BRIEF DESCRIPTION OF THE DRAWING

A more complete understanding of the present disclosure may be realized by reference to the accompanying drawing in which:

FIG. 2(A) overall system implementation for traffic sensing and cable safety protection application; FIG. 2(B) a sensed, time-stamped data stream with non-uniform time lapses; and FIG. 2(C) traditional mapping of the sensed data to an image on a regular grid which may lead to inaccurate vehicle speed estimation and results—all according to aspects of the present disclosure;

Figure 1:
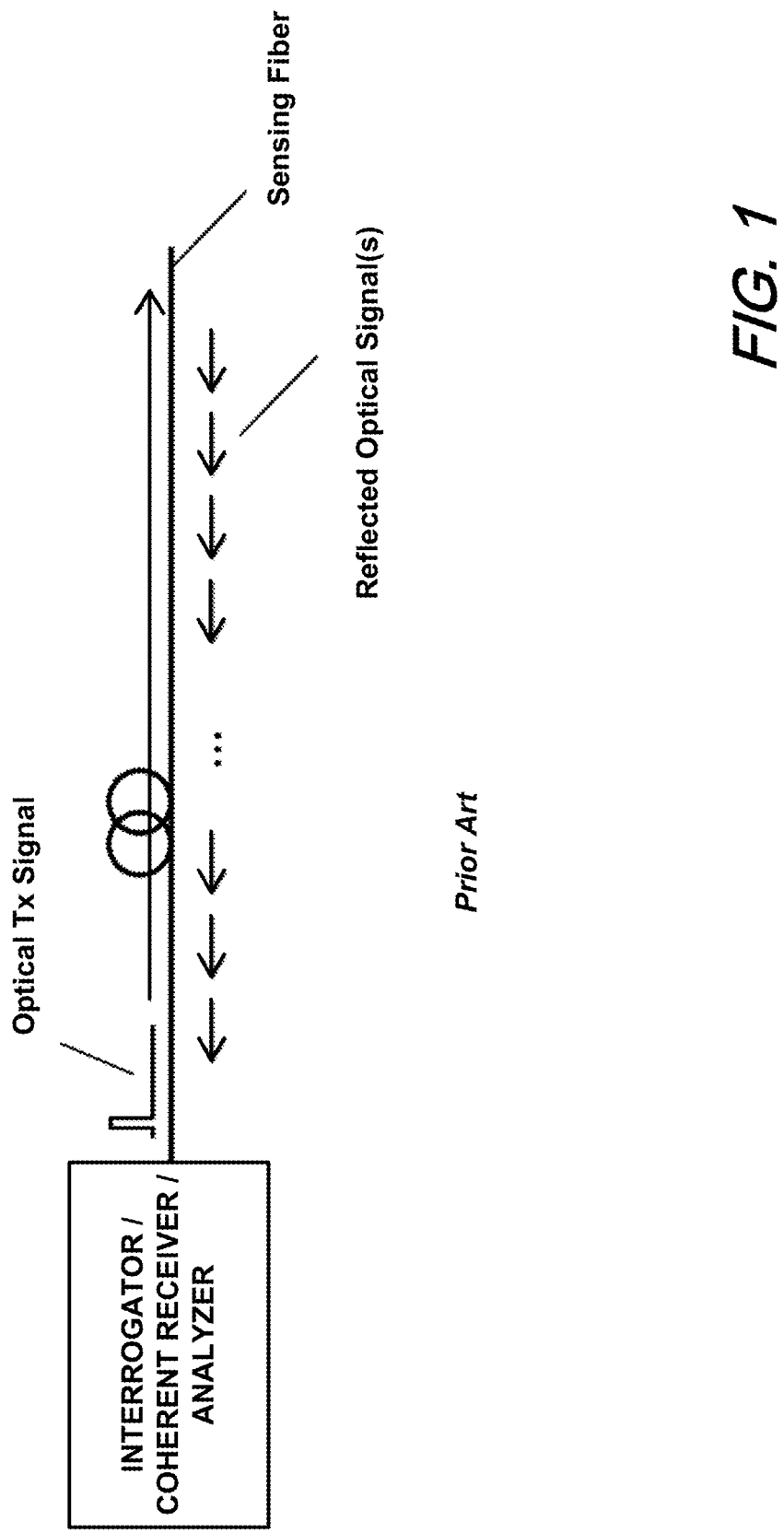
FIG. 1 is a schematic diagram of an illustrative DFOS arrangement as is known in the art.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background—we again note that in recent years, distributed fiber optic sensing (DFOS) systems including distributed vibration sensing (DVS) and distributed acoustic sensing (DAS) have found widespread acceptance in numerous applications including—but not limited to—infrastructure monitoring, intrusion detection, and earthquake detection. For DAS and DVS, backward Rayleigh scattering effects are used to detect changes in the fiber strain, while the fiber itself acts as the transmission medium for conveying the optical sensing signal back to an interrogator for subsequent analysis.

By way of some additional background—and with reference to FIG. 1 which is a schematic diagram of an illustrative distributed fiber optic sensing system generally known in the art—we begin by noting that distributed fiber optic sensing (DFOS) is an important and widely used technology to detect environmental conditions (such as temperature, vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

We note once more that one aspect of the present disclosure describes using existing deployed fiber optic cable as a sensing media to detect/determine abnormal vibrations proximate to the sensing fiber. Abnormal events for example, excavator, drilling rig, jackhammer, etc. can be automatically discovered by distributed fiber optic sensing (DFOS) technologies early—before cable cut events happen. We note again that there exists an urgent need for cable safety protection systems since optical fiber networks play important roles in communication for both service provides and end users. Hence, fiber cut events are critical issues since they result in down time, rais maintenance costs and increase any service provider's service level agreement penalty(ies).

As such, employing distributed optic fiber sensing (DFOS) techniques is an attractive approach to threat level detection since DFOS can sense the vibration signals in the vicinity of the buried cable and generate time-stamped data stream of vibrations, providing valuable information for decision making in road traffic management and communication cable protection. To achieve both goals of traffic monitoring and anomaly detection via fiber sensing, isolating causes of normal traffic vibrations from vibrations having other source(s) poses a difficult challenge.

For our purposes however, due to the low sensitivity of the pre-deployed fiber cable, deterioration of road conditions, and the heterogeneity in vehicle-road interactions, sensed traffic patterns are usually noisy, intermittent, with varied intensities. Moreover, the processing unit in DFOS interrogator outputs data with non-constant time laps between individual measurements, ranging from less than 60 milliseconds to more than 250 milliseconds, resulting in irregularly sampled data with non-equidistant time laps. In addition, although the vibration patterns caused by normal traffic are abundant with a linear structure easy to identify by human eye, the vibration patterns caused by unauthorized cable-threatening activities are unknown. As a result, it is hard to obtain labeled training data that cover all possible classes of anomaly and it is very costly to annotate all the traffic patterns as well. Since labels are expensive, training a supervised model for automatically interpreting waterfall data is difficult.

As such, an aspect of the present disclosure describes identifying traffic-related vibration patterns from corrupted, non-uniform sampled stream data from distributed fiber optic sensors, which is needed in both tasks of road traffic sensing, and unknown anomaly detection under heavy traffic noise.

We advantageously represent sensed data accurately as a set of points, where each point is denoted as a tuple with elements indicating time stamp, location on the fiber sensing cable, and vibrating strength.

Our traffic pattern detection operation/module is based on progressive probabilistic Hough transform (PPHT). Different from methods based on local kernel matching on images, this module exploits global information from the whole spatial-temporal data snapshot to assess the cause of vibration. Importantly, it does not assume a regular grid of images, so it is applicable to practical sensing scenarios where the time stamps are not equidistant.

In sharp contrast to traditional Hough Transform (HT) for line detection, our inventive operation/module segments traffic traces from individual vehicles, even if they are discontinuous and/or ambiguous in a region. As we have determined, the additional parameters of PPHT about a minimum specified length of a vehicle trace and maximum gap between adjacent traces make traffic count(s) more accurate as compared with prior methods. Computationally, the progressive nature of our method minimizes operations needed and is well suited for the streaming nature of data with limited processing power on the edge. For anomaly detection applications, identified traffic-related vibration patterns are then removed by a binary mask derived from dilation.

One goal of our inventive approach as described herein is a monitoring and alert system that protects optical cables via distributed fiber sensing from unauthorized third-party interventions. Since—in operation—we lack knowledge of signal characteristics of anomalies—we determine vibrating patterns from normal traffic that generally exhibits a linear slope that corresponds to the speed of a vehicle and any acceleration and/or deceleration resulting from traffic conditions and/or traffic controls (i.e., traffic lights). We note that while traffic data is abundant—anomaly data is sparse.

According to aspects of the present disclosure, distributed optic fiber sensing technology is used to detect vibrations at a plurality of single optical fiber cable points along long optical fiber cable route (i.e., >40 km) in real time. The saliency of each vibrating point is determined locally under a rule of interquartile range (IQR). Although the saliency of each vibrating point can be determined locally, the spatial-temporal pattern of relevant points are taken into account in determining its cause. By applying a progressive probabilistic Hough transform (PPHT) algorithm, the cause of each vibrating point can be attributed globally by seeking evidence from other vibrating points. As a result, a group of vibrating points is classified to be caused by traffic, if they collectively form a linear shape and well aligned to our priori knowledge. Advantageously, our inventive procedure requires no training and no labeling of the traffic regions or anomaly regions.

A traffic filter operation further refines identified traffic traces, according to a minimum and maximum speed limit allowed. For example, slowly moving and speeding vehicles can be differentiated based on the range of speed limits. The positive and negative sign of slope naturally deals with crossing traffic from both directions of a highway being sensed. This is in sharp contrast to prior-art—local pattern matching based methods that oftentimes suffer from crossing traffics patterns.

As we shall show and describe, once a traffic trace is detected on a waterfall plot resulting from DFOS operation, any nearby vibrating points can be attributed as well, if the point to segment distance is within a specified range. However, repeating this processing point by point is computationally expensive. Alternatively, we create a binary mask based on dilation of the detected trace segments. The road surface condition and buried depth of cable in each region can be different, which brings additional variability in the width of traffic traces. The dilation factor can be specified as an appropriate integer, which allows traffic trace of different width to be removed.

As will be appreciated by those skilled in the art, our inventive approach operates on a most primitive unit—a vibrating point along the length of the optical sensing fiber—there is no sliding window need. Thus, an abnormal score at each optical fiber cable point can be naturally computed from the total intensity from residual vibration patterns that are salient but not caused by traffic.

Figure 2A:
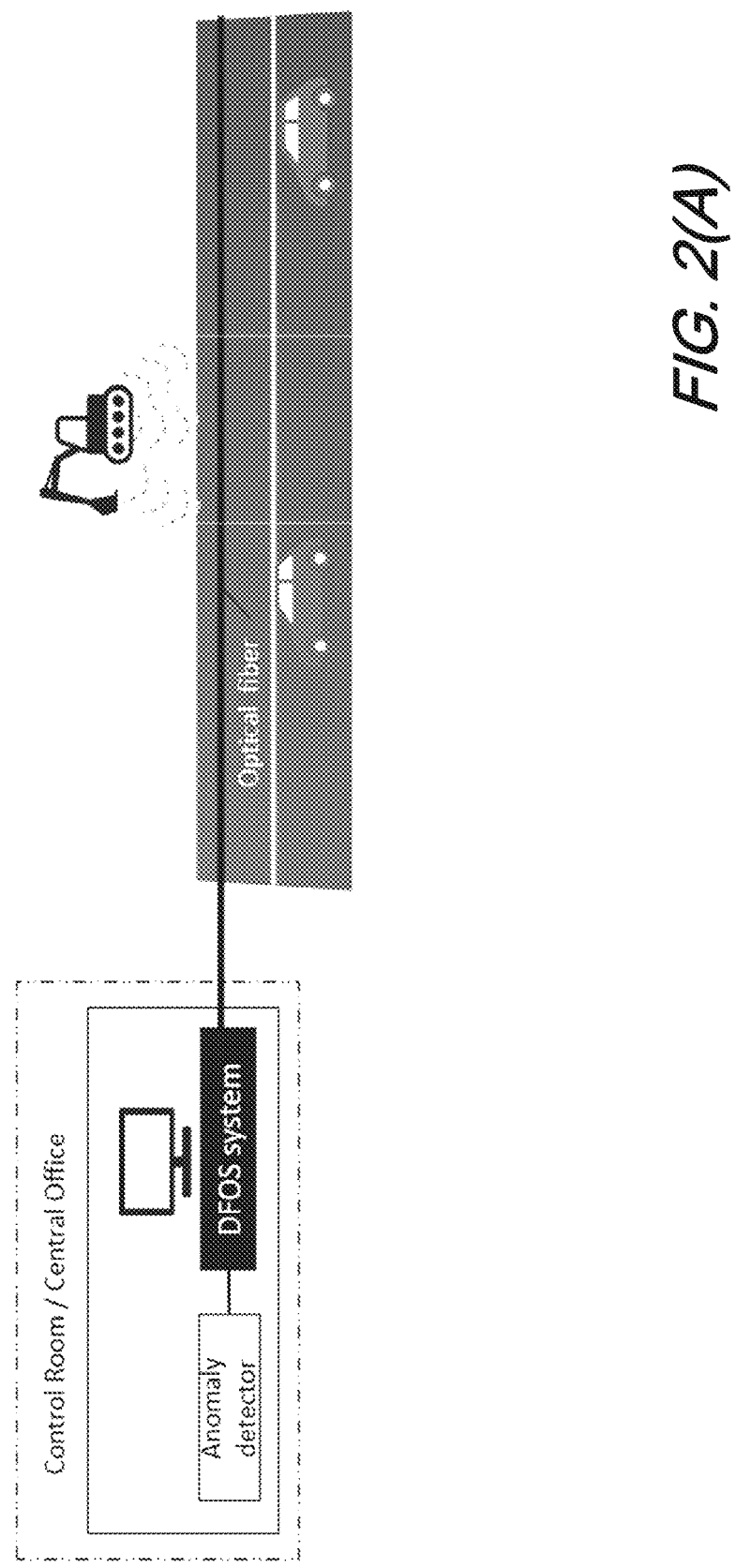
FIG. 2(A), FIG. 2(B), and FIG. 2(C) show illustrative.
Figure 2B:
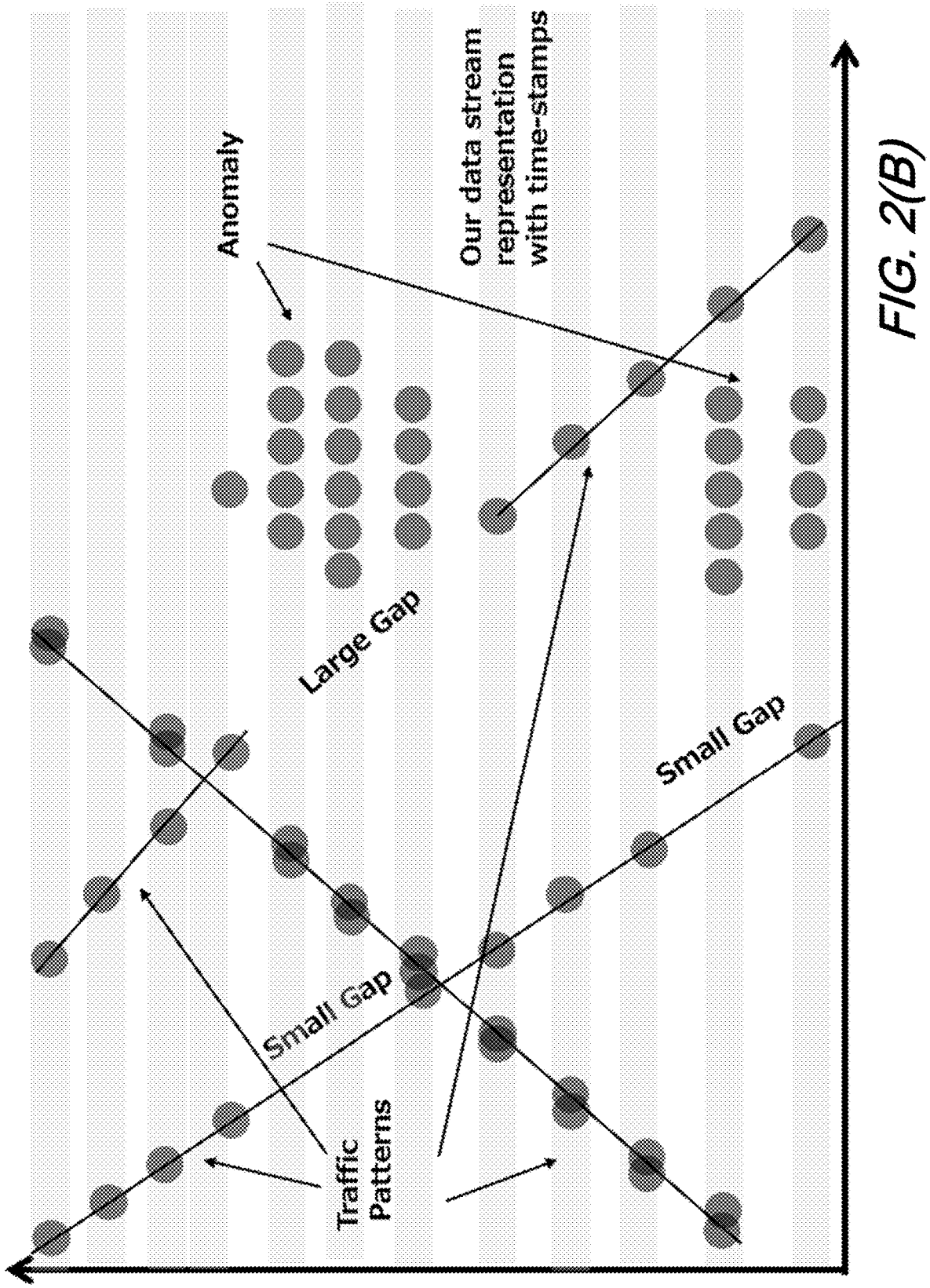
Figure 2C:
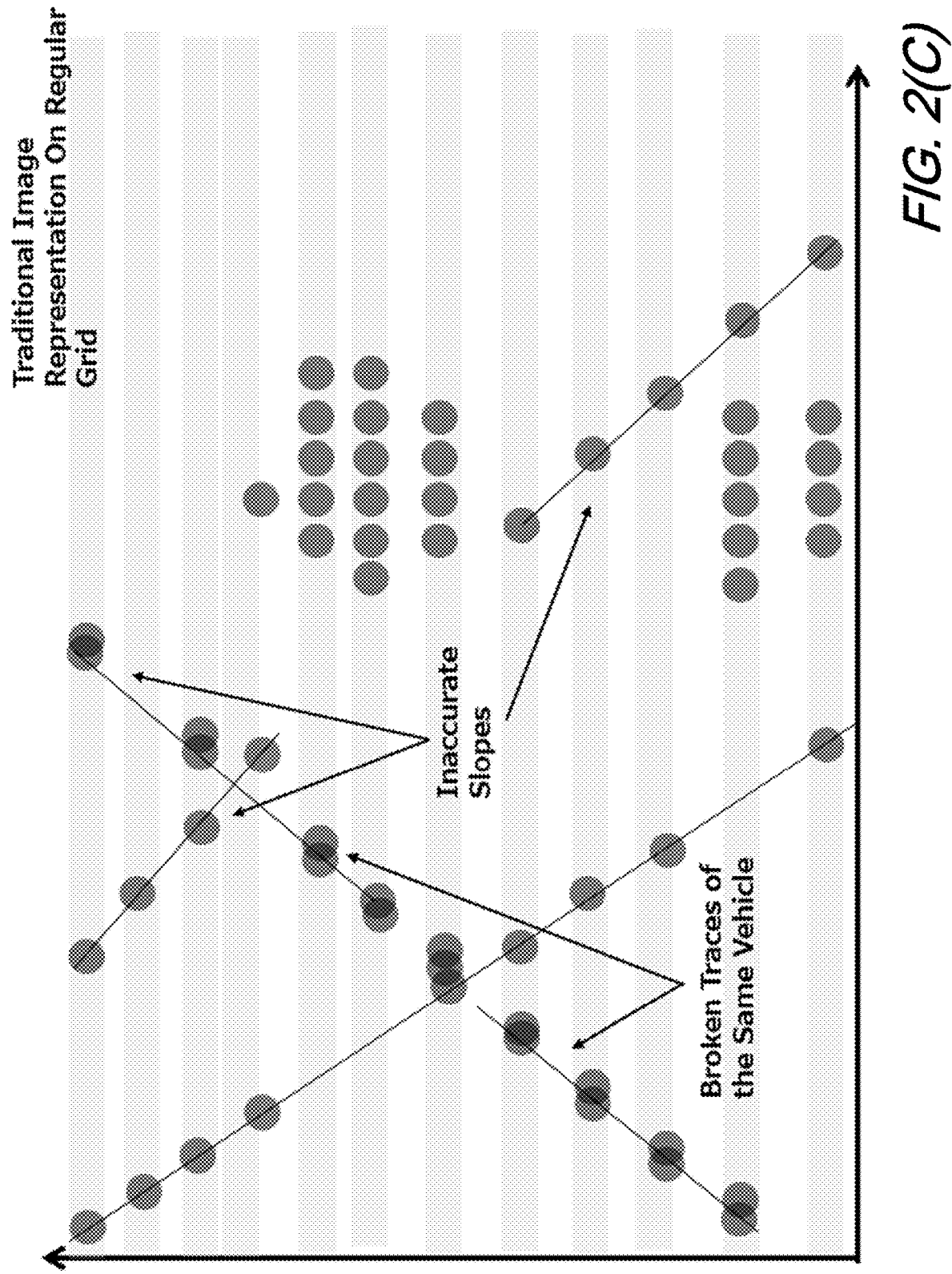

FIG. 2(A), FIG. 2(B), and FIG. 2(C) show illustrative: FIG. 2(A) overall system implementation for traffic sensing and cable safety protection application; FIG. 2(B) a sensed, time-stamped data stream with non-uniform time lapses; and FIG. 2(C) traditional mapping of the sensed data to an image on a regular grid which may lead to inaccurate vehicle speed estimation and results—all according to aspects of the present disclosure.

With simultaneous reference to these figures, shown is a distributed fiber optic sensing system including a DFOS system including sensing fiber, interrogator, traffic monitoring, and unknown anomaly detection operations that may be generally located within a control room or other centralized office. The optical sensing fiber is of sufficient length that it may underlie a roadway or adjacent area. When the roadway undergoes vehicle traffic, the DFOS system may detect vibrations caused by the vehicular traffic.

As noted, construction or other operations that occur proximate to the roadway may threaten the integrity of the DFOS optical fiber that is used for sensing. Such a threat is shown in the figure as an excavator next to the roadway under which the optical sensing fiber is positioned.

FIG. 2(B) is a time vs. distance plot of vibrational patterns sensed by the DFOS system. As plotted, individual traffic patterns are displayed with some showing small gaps in data and others showing large gaps in the data collected. As may be observed, where the data is plotted linearly, it may be indicative that such patterns—even with gaps—may be vehicular traffic. Shown further are clusters of data that are not part of the traffic patterns. Such clusters may be determined to be anomalies.

In contrast, FIG. 2(C) shows a time vs distance plot that may be of a more "traditional" approach where no association between vibrations and traffic patterns and/or anomalies are made.

Figure 3:
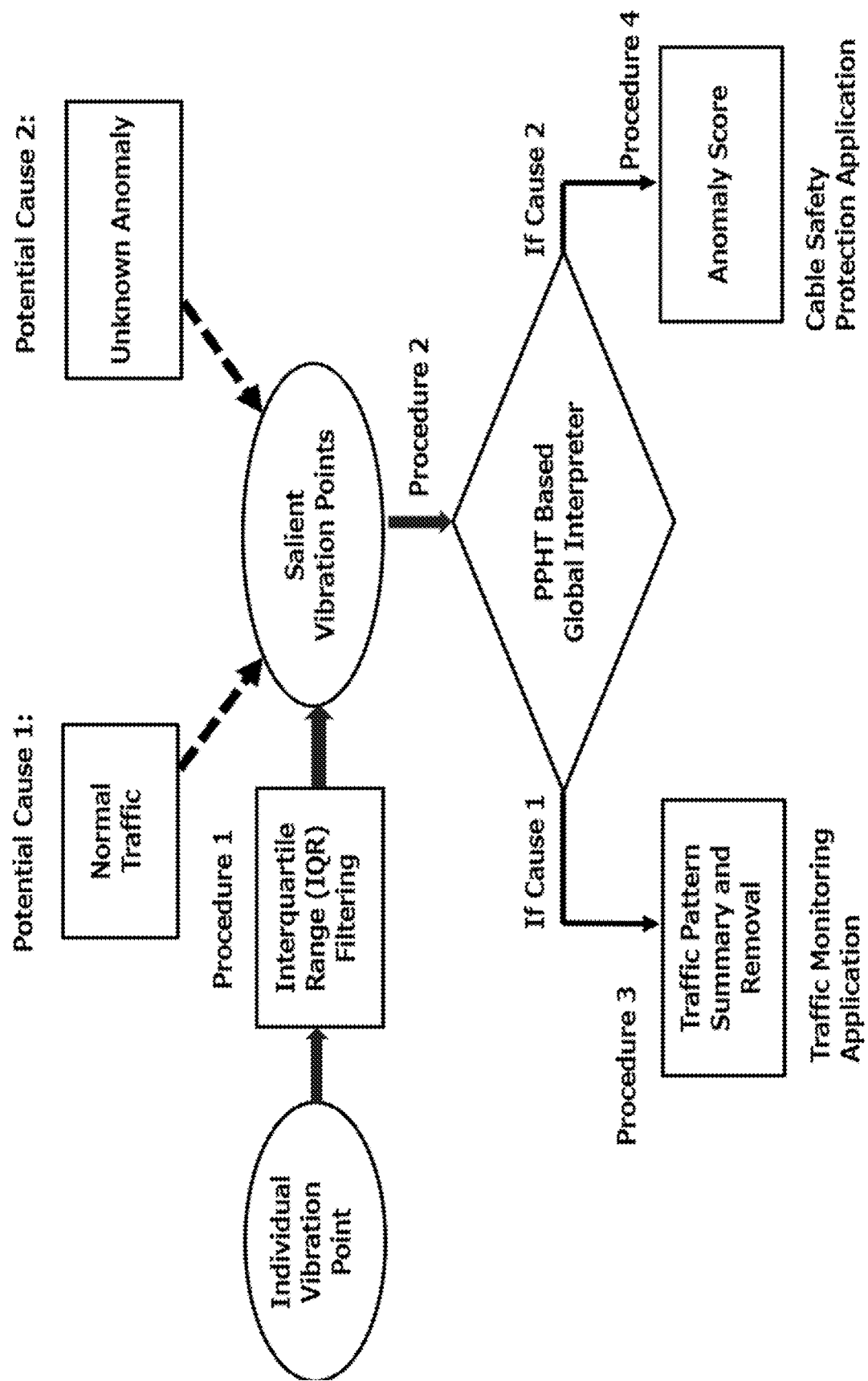
FIG. 3 is a schematic flow diagram illustrating data processing units. The procedures can be defined in following steps FIG. 4(A), FIG. 4(B), FIG. 4(C), and FIG. 4(D) schematically illustrate processes of traffic detection, summary, and removal according to aspects of the present disclosure.

FIG. 3 is a schematic flow diagram illustrating data processing units according to aspects of the present disclosure. As illustrated in that figure, potential causes of vibrations include normal traffic and/or unknown anomalies. Operationally, an individual vibration point is sensed and an interquartile range (IQR) filtering operation determines whether or not such point is a salient vibration point at a given point of time. Such operation is performed for a plurality of points along the length of the optical sensing fiber.

Once the salient vibration points are identified, a PPHT based global interpretive operation is performed which identifies traffic patterns and anomaly vibrations. The traffic patterns may be summarized and utilized by traffic monitoring applications. Similarly, anomalous vibrations may be further analyzed once traffic patterns are removed to determine whether cable/fiber integrity is of concern.

Data Representation

The sensed data comprising a scene are represented as a group of vibrating points $\{p_i\}$, $i=1, \ldots, N$. Each vibrating point is a tuple $(t_i, x_i, v_i)$, where $t_i$ is the time-stamp, $x_i$ is the spatial location along the cable, and $v_i$ is the strength of vibration.

Operatively, one aspect of our innovative method filters out (determines) the salient vibrating points and subsequently determine its cause—the result of which is used for downstream tasks of traffic sensing and anomaly detection.

Procedure 1: Saliency Filter—Finding Strong Vibration Points Locally

Under a sensing scene $[t_{start}, t_{end}] \times [x_{start}, x_{end}]$, a group of vibrating points $\{p_i\}$ is obtained, which satisfies the conditions $t_{start} < t_i < t_{end}$ and $x_{start} < x_i < x_{end}$. The saliency of vibration is determined by its vibration strength. A vibrating point is a salient vibrating point, if its vibrating strength falls more than 1.5×IQR above the third quartile. That is, Salient points>$Q_3$+1.5×IQR. The IQR of vibrating strength $\{v_i\}$ is calculated as the difference between the upper and lower quartiles, $Q_3 - Q_1$. Since IQR is computed from statistics of each zone over a period, the saliency filter is adaptive and robust.

Procedure 2: Assessing the Cause of Vibration Globally Based on PPHT

As currently and illustratively implemented, PPHT based Global Interpreter includes three modules: segment detection, traffic trace qualification, and association of nearby pixels.

FIG. 4(A), FIG. 4(B), FIG. 4(C), and FIG. 4(D) schematically illustrate processes of traffic detection, summary, and removal according to aspects of the present disclosure.

Segment detection: As shown in these figures, a group of salient vibration points can be mapped from original space (FIG. 4(A)) to a single point in the accumulator space (FIG. 4(B)), if they form a pre-specified shape (e.g., linear). The parameter fully specifies the segment when mapped back to the original space (FIG. 4(C)). Following the segment, we find the longest length of the corresponding line segment and check the gaps in the segment.

Traffic Trace Qualification

A detected segment is qualified as normal traffic trace, if it satisfies the following conditions: a) it is supported by enough evidence (i.e., number of salient vibration points); b) the length of trace is large than the specified threshold; c) the gap of trace is smaller than the specified threshold; and d) its speed as indicated by the slope is within speed limits.

Association of Nearby Pixels

Figure 4A:
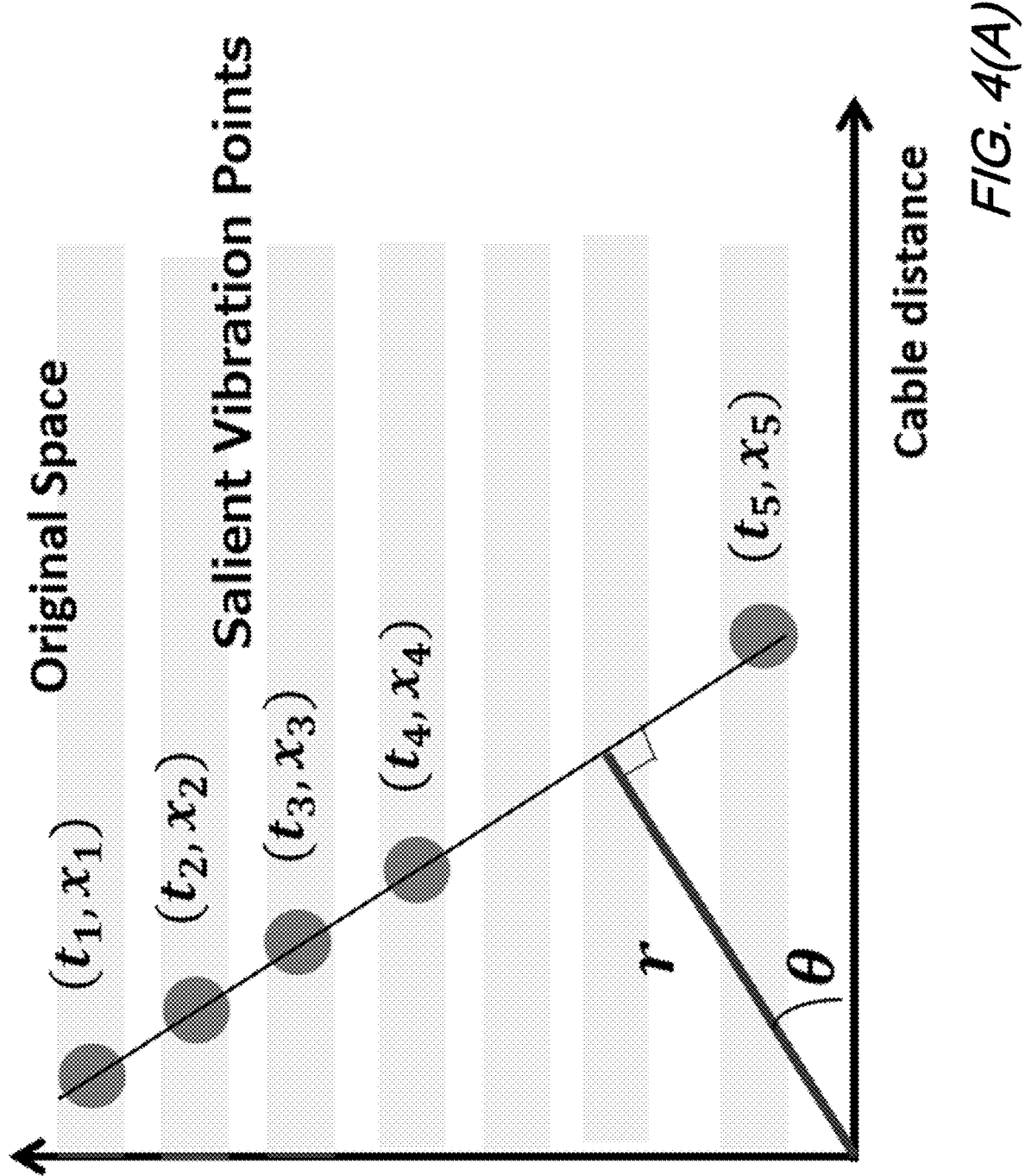
Figure 4B:
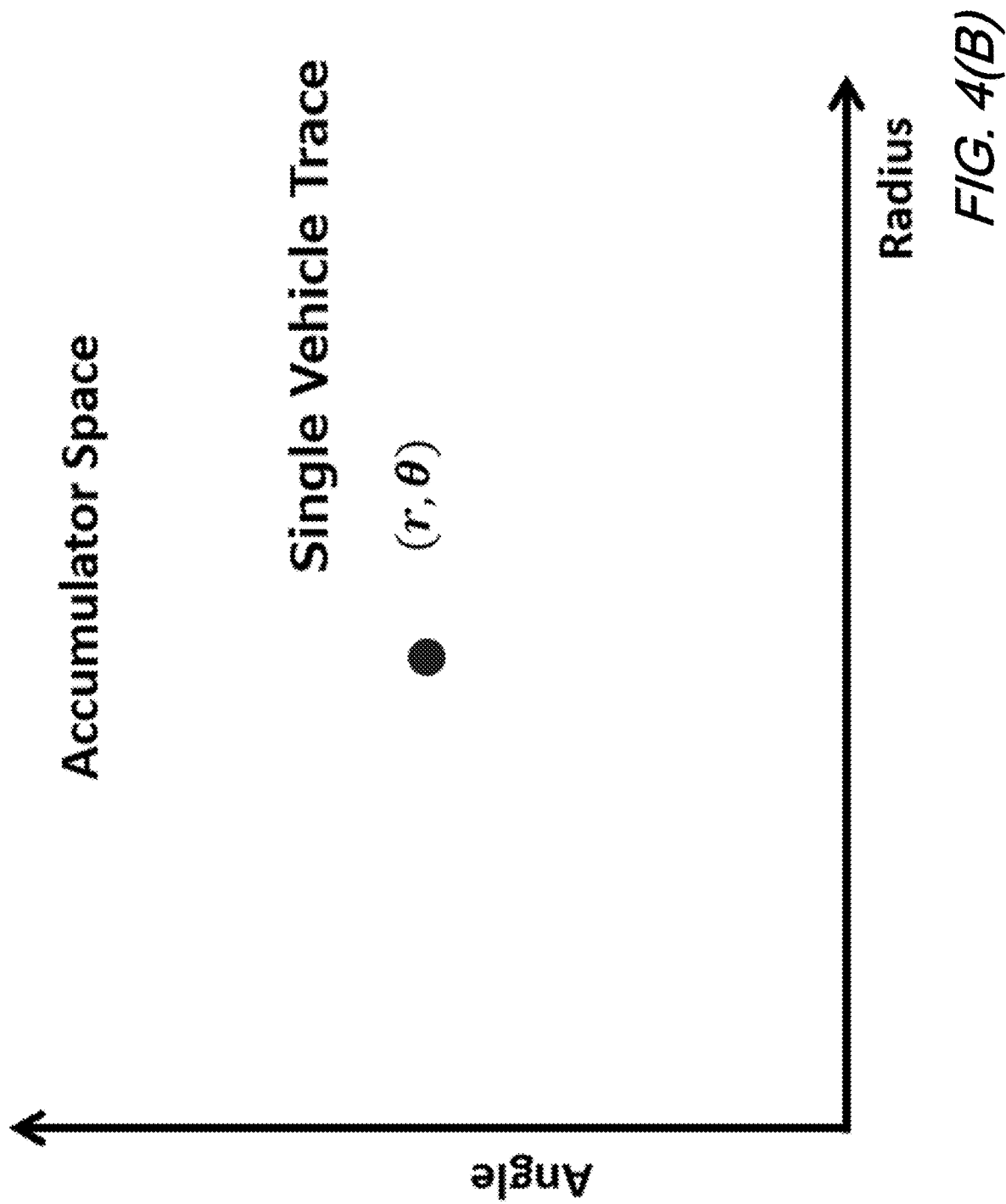
Figure 4C:
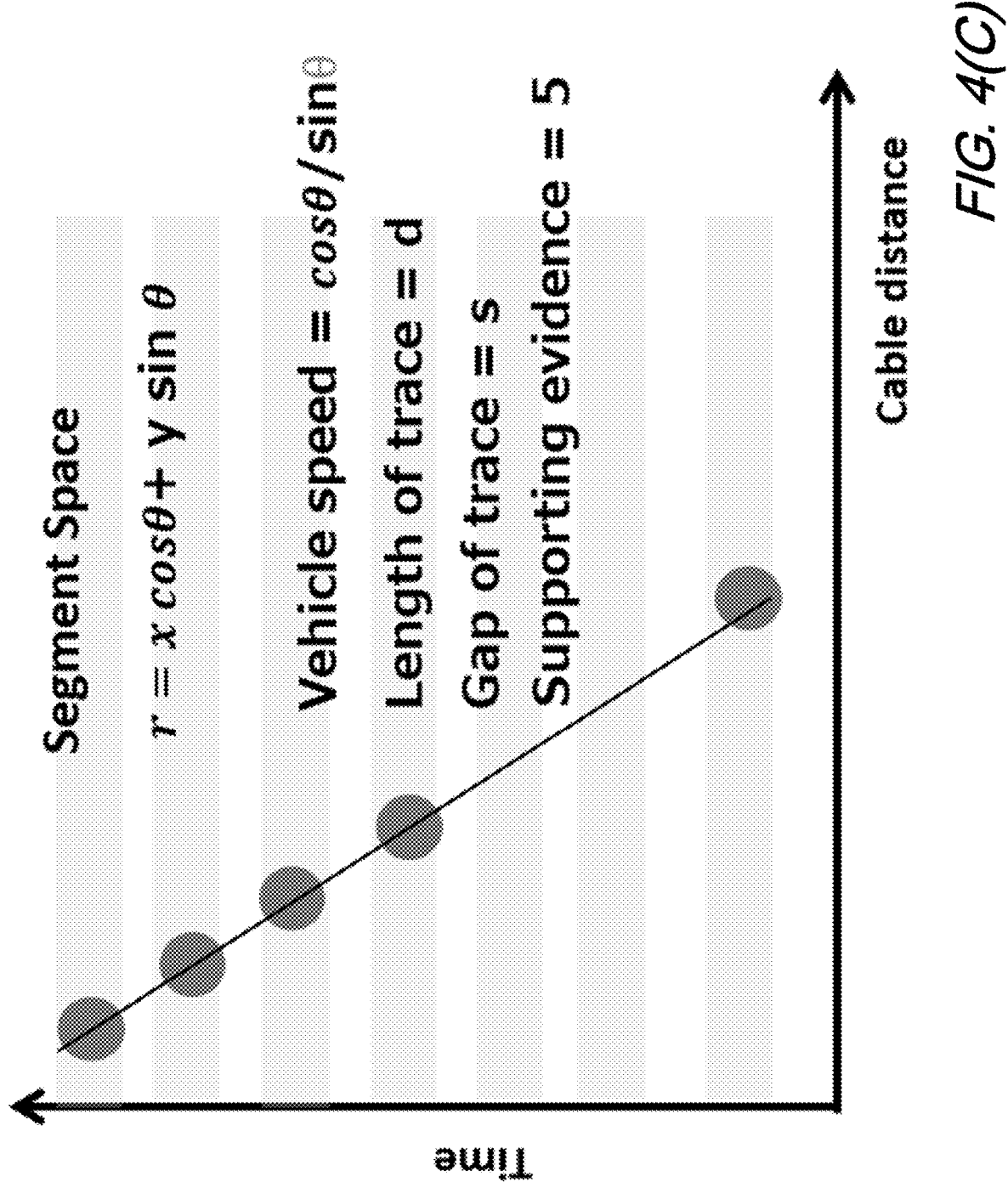
Figure 4D:
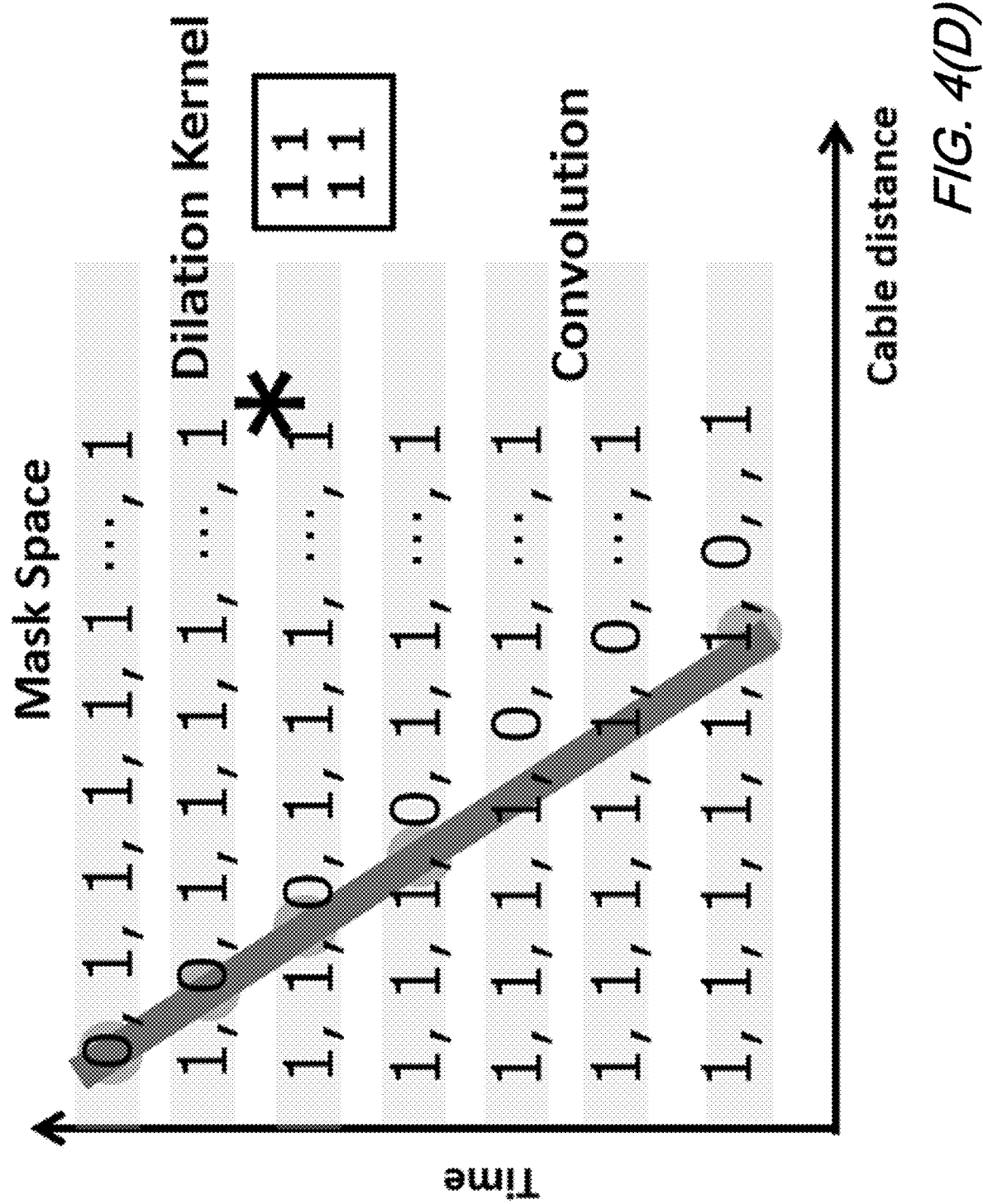

Vibrating points nearby a qualified traffic trace are attributed to traffic as well. In FIG. 4(D), a binary mask is generated based on the detected traffic trace by drawing segment from the starting point to the end point on a matrix. A dilation kernel can be applied by convolution, resulting to a binary mask that segment traffic with residual. This mask can be used to remove the traffic-related vibrations.

Procedure 3 (Optional): Summarizing Traffic Patterns

Traffic information is stored in the set of qualified segments. Depending on the needs in traffic monitoring, high-level summary statistics can be easily computed out of it. For example, the average, maximum, and minimum speed of vehicles in a certain region during a certain period can be computed based on the slopes. Traffic count can be computed by the number of crossing points between segments and vertical line at the query location.

Procedure 4: Computing Anomaly Score from Residual

Figure 5:
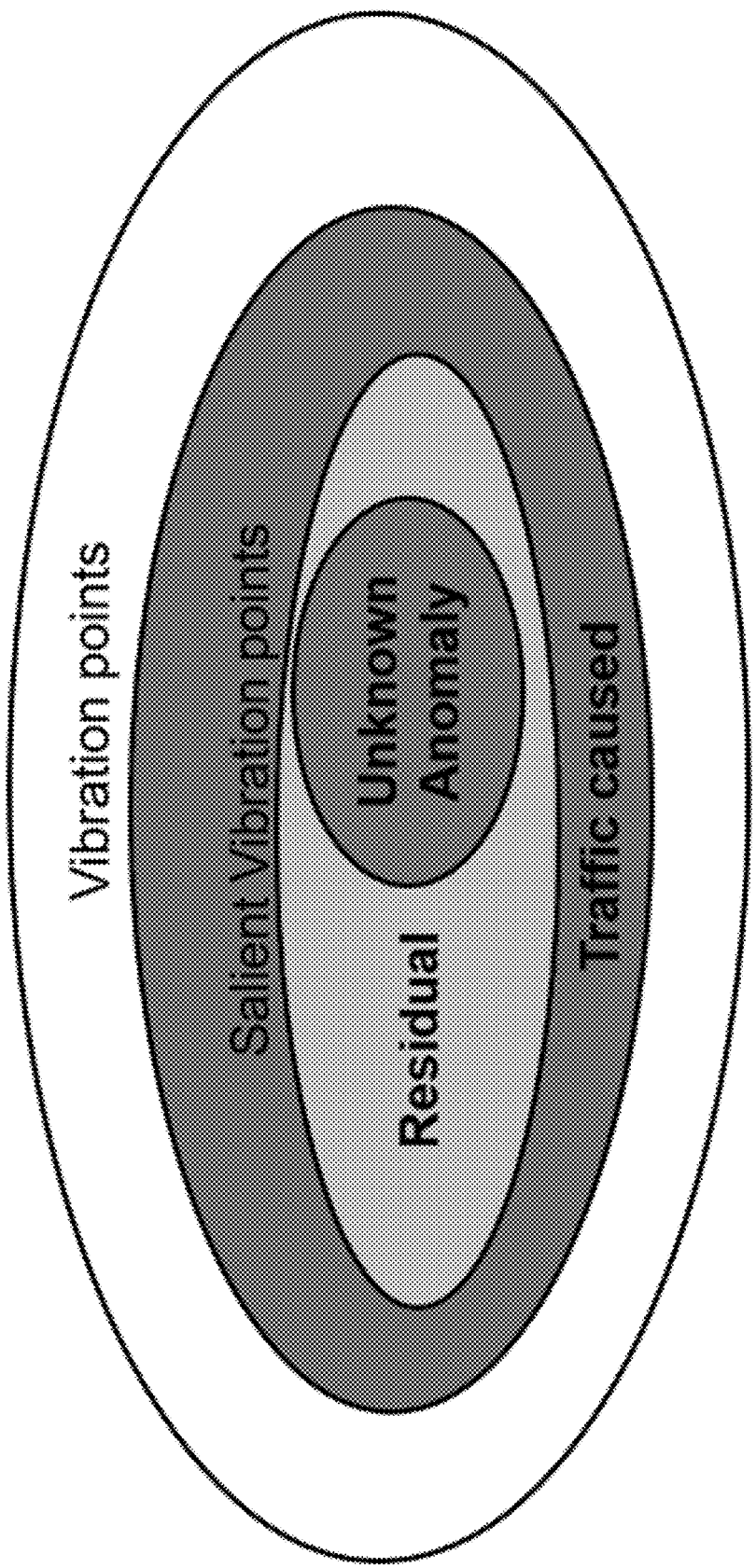
FIG. 5 is a schematic Venn diagram illustrating unknown anomaly detection according to aspects of the present disclosure.

FIG. 5 is a Venn diagram illustrating unknown anomaly detection according to aspects of the present disclosure. Most of the salient vibration points (identified by procedure 1) will be attributed to normal traffics (procedure 2). However, the residual salient vibration points will be considered as anomalous if the cumulative intensity go beyond the location specific threshold.

One can either assign personnel to check onsite or if available, trigger a classifier to confirm the machine/action type. Since the normal traffic patterns have been removed by dilation, the traffic-related false alarm rate is extremely low.

As those skilled in the art will understand and appreciate, our inventive method is computationally efficient. The PPHT saves significant computation than traditional HT, as it only operates on a subset of the candidate vibration points. The processing of vibration points and segments is parallelizable.

Figure 6:
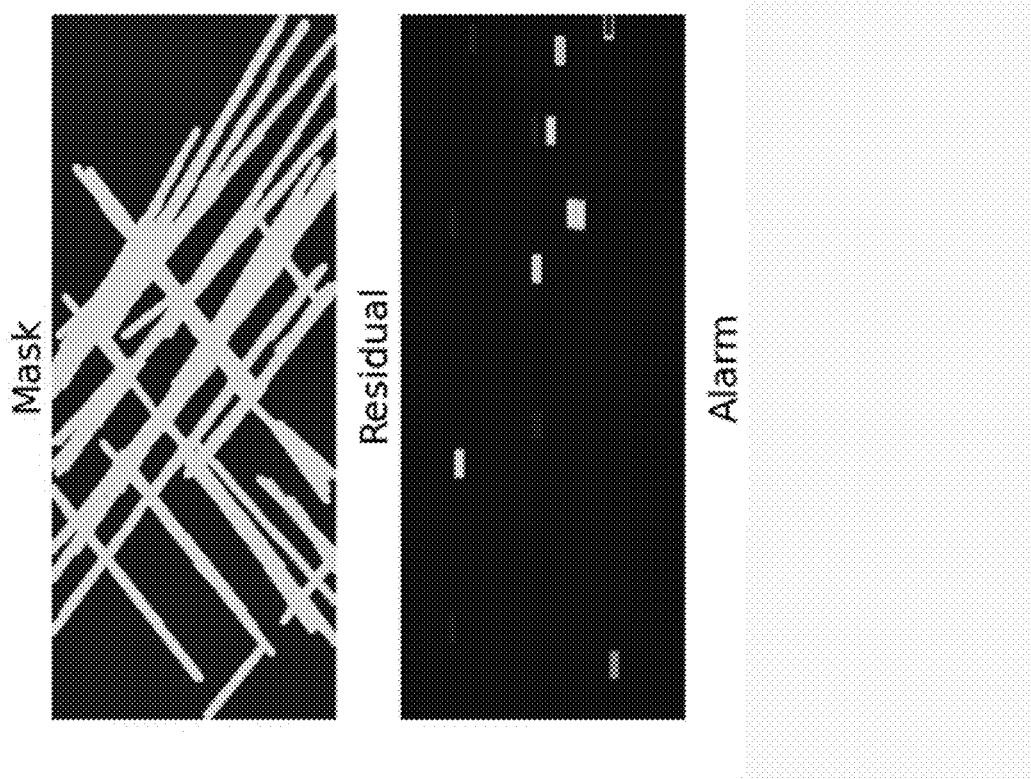
FIG. 6 is a series of illustrations showing related Waterfall, Mask, Traffic, Residual, Abnormal score and Alarms for an example field trial of normal traffic without anomaly according to aspects of the present disclosure.
Figure 6:
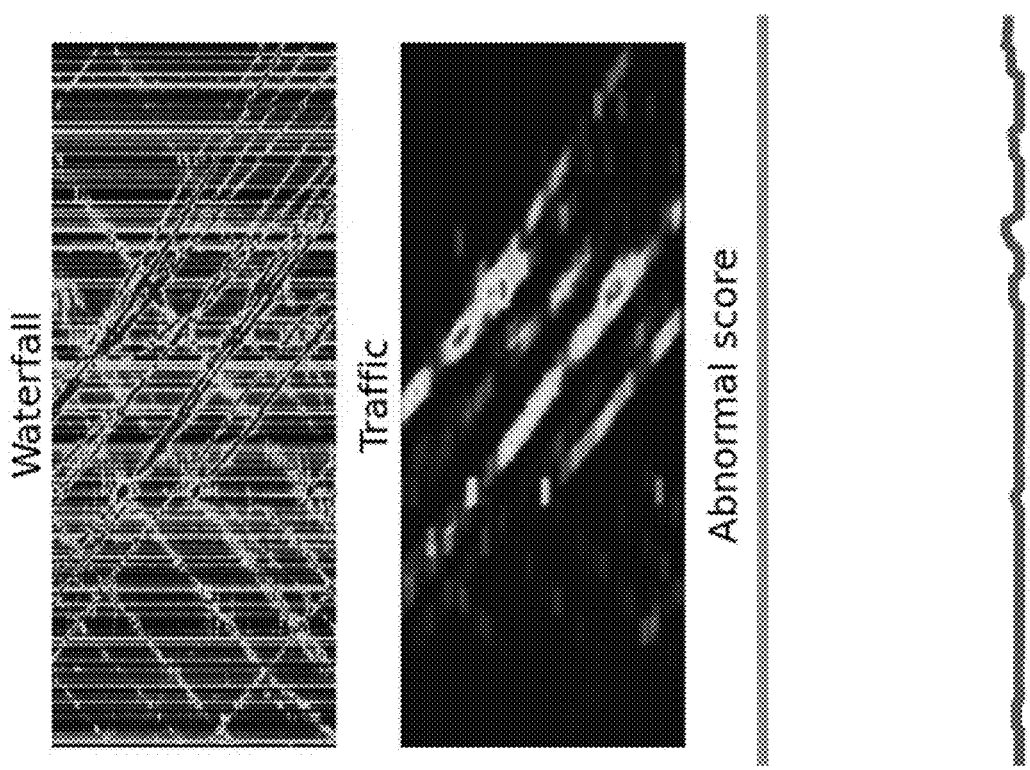
Figure 7:
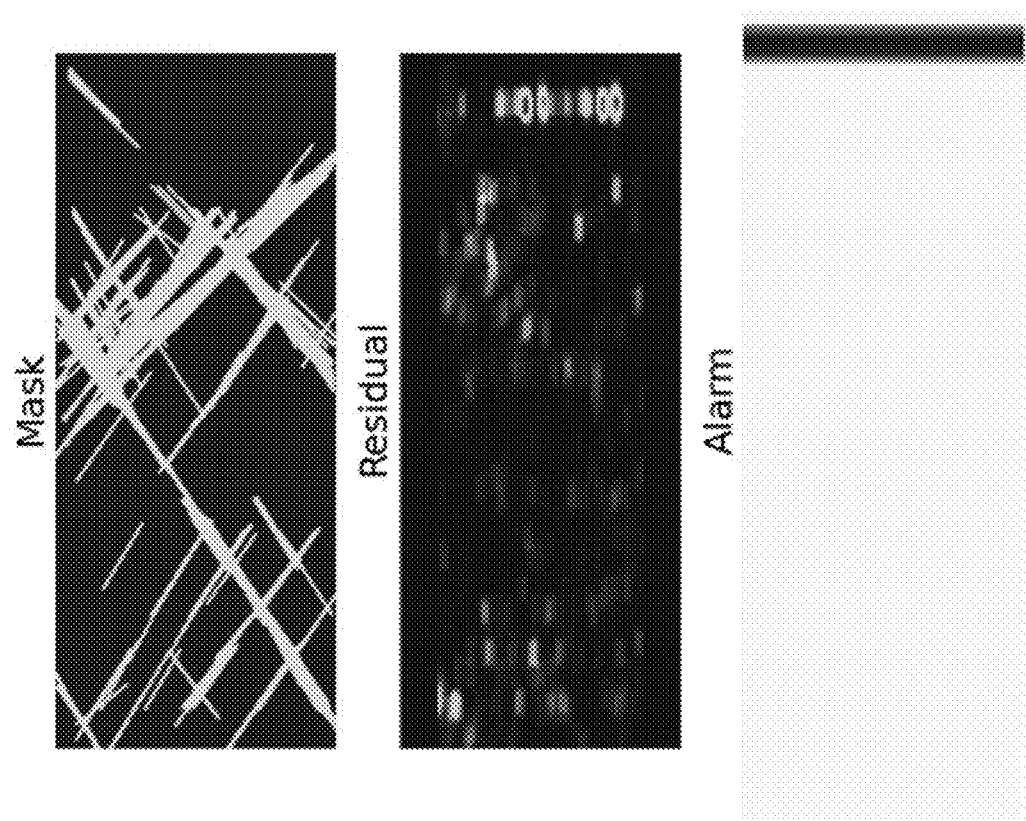
FIG. 7 is a series of illustrations showing related Waterfall, Mask, Traffic, Residual, Abnormal score and Alarms for an example field trial with unknoown anomaly under traffic noise according to aspects of the present disclosure.

FIG. 6 is a series of illustrations showing related Waterfall, Mask, Traffic, Residual, Abnormal score and Alarms for an example field trial of normal traffic without anomaly according to aspects of the present disclosure and FIG. 7 is a series of illustrations showing related Waterfall, Mask, Traffic, Residual, Abnormal score and Alarms for an example field trial with unknown anomaly under traffic noise according to aspects of the present disclosure.

With reference to these figures, it may be observed that both show illustrative waterfall data acquired in a field trial along with results of detected traffic trace according to aspects of the present disclosure. Vibration points in the sensed waterfall data are segmented into two groups: traffic and residual. The location specific abnormal score indicates whether there are anomaly events or not. An alarm is trigged is the abnormal score exceeds the threshold.

Figure 8:
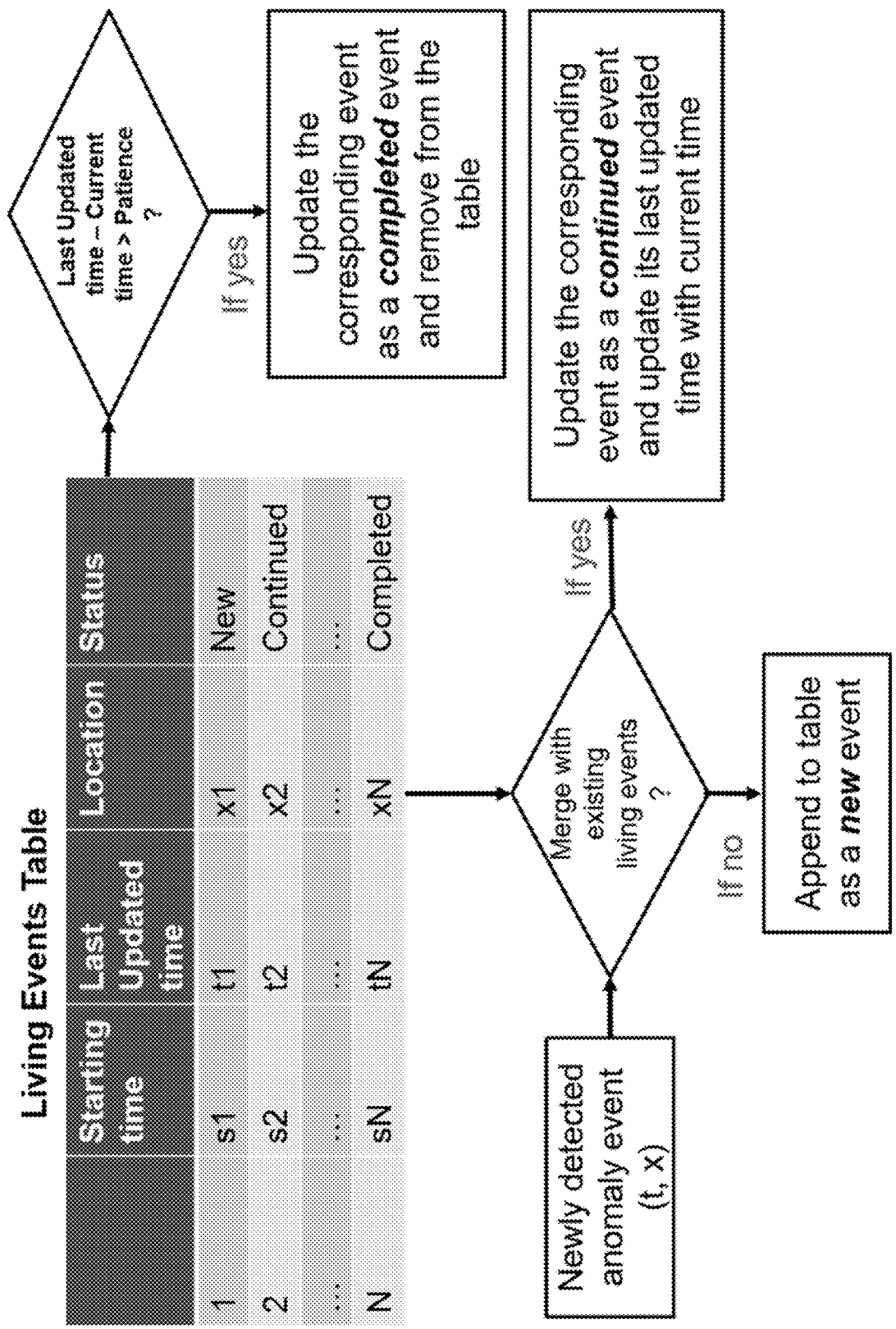
FIG. 8 shows a flow chart for new event logging and live event table updates according to aspects of the present disclosure.

FIG. 8 shows a flow chart for new event logging and live event table updates according to aspects of the present disclosure. As illustrated in this figure, it describes how to maintain and update an event log, for the purposes of abnormal events tracking and real-time alert.

According to the present disclosure, every event may be in one of three statuses namely, new, continued, or completed. Once an anomaly event is detected, it is compared to the existing events in the living events table. If the time and location are sufficiently close to one another, then they are merged to the old event as a "continued" event. Otherwise, it will be appended to the table as a "new" event and an alert is transmitted. The events in the table are removed, if the last updated time goes behind current time for a period (i.e., patience).

At this point those skilled in the art will understand and appreciate a number of distinguishing features of our inventive disclosure. First, our disclosure advantageously employs distributed fiber optic sensing (DFOS) over optical cable in which a) the DFOS systems can be distributed acoustic sensing (DAS) an distributed vibration sensing (DVS); b) the optical fiber cable can be existing deployed cable and/or newly laid fiber; and c) for existing deployed cable, our disclosed method can be integrated to dark fiber and/or operational fiber.

Second, our disclosed data collection advantageously a) employs understood DFOS technology along a deployed fiber for traffic sensing and cable safety protection; and which we may advantageously b) blank out aerial cable regions and/or central office (CO) related regions.

Third, according to aspects of our disclosure, data representation is made most useful in that the data (i.e., irregular sampled sensing data) is represented as a set of ordered lists with elements including time, location, strength, etc., as opposed to images on regular grid.

Fourth, our disclosed data processing operations include: a) a local saliency filter applied to each vibration point based on adaptive intensity threshold with IQR rule and robust zone statistics; b) collectively assessing the cause of salient vibration from multiple points for detection of traffic trace, unknown anomalies under traffic noises; c) an application of Progressive Probabilistic Hough Transform (PPHT), instead of the classical Hough Transform (HT), for detection with better accuracy and less computation; d) the qualification of the detected segment as normal traffic trace, based on tailored parameters of PPHT, including accumulator threshold, minimum line length, the speed limit, and maximum line gap, according to any prior knowledge about normal road traffic; and e) the binary dilation operator for efficient traffic trace removal.

Fifth, our disclosed method may advantageously include event logging that: a) provides location specific threshold(s) at each optical cable point sensed; and b) accumulate anomaly score(s) for longer time periods to reduce false alarms.

Finally, and sixth, our inventive method may advantageously report anomalies resulting from: a) cumulative evidence from aggregate abnormal scores from multiple patches (to reduce false alarms); b) Customized threshold levels to send alert messages to users; c) location specific threshold derived adaptively from normal statistics; and d) integrated with cable information on a map to report GPS location when events have been discovered.

At this point, while we have presented this disclosure using some specific examples, those skilled in the art will recognize that our teachings are not so limited. Accordingly, this disclosure should be only limited by the scope of the claims attached hereto.

The invention claimed is:

1. A method for operating a distributed fiber optic sensing (DFOS) system including a length of optical sensing fiber in optical communication with a DFOS interrogator and anomaly detector, said method comprising:

providing the DFOS system wherein the optical sensing fiber is deployed proximate to a roadway;

operating the DFOS to obtain normal characteristics of the roadway including road traffic and other infrastructure vibration patterns proximate to the sensing fiber; and determining, from waterfall images generated during operation of the DFOS, traffic patterns in the waterfall images through the operation of a probabilistic Hough transform (PPHT);

determining salient vibration points along the optical sensing fiber and using those determined salient vibration points in the PPHT operation to determine the traffic patterns; and determining vibrational anomalies vibration patterns by removing the determined traffic patterns.

2. The method of claim 1 wherein the vibration patterns include sensed data represented in a group of vibration points $\{p_i\}$, i=1, ..., N, where each vibrating point is a tuple $(t_i, x_i, v_i)$, where $t_i$ is the time-stamp, $x_i$ is the spatial location along the optical sensing fiber, and $v_i$ is the strength of vibration.

3. The method of claim 2 wherein a salient vibration point is determined by its vibration strength and is a salient vibration point if its vibration strength is more than 1.5 inter quartile range (IQR) above a third quartile which is represented by:

Salient Point$>Q_3+1.5 \times IQR$, and the IQR of vibrating strength $\{v_i\}$ is a difference between upper and lower quartiles, $Q_3$-$Q_1$.

* * * * *